Figure 1:
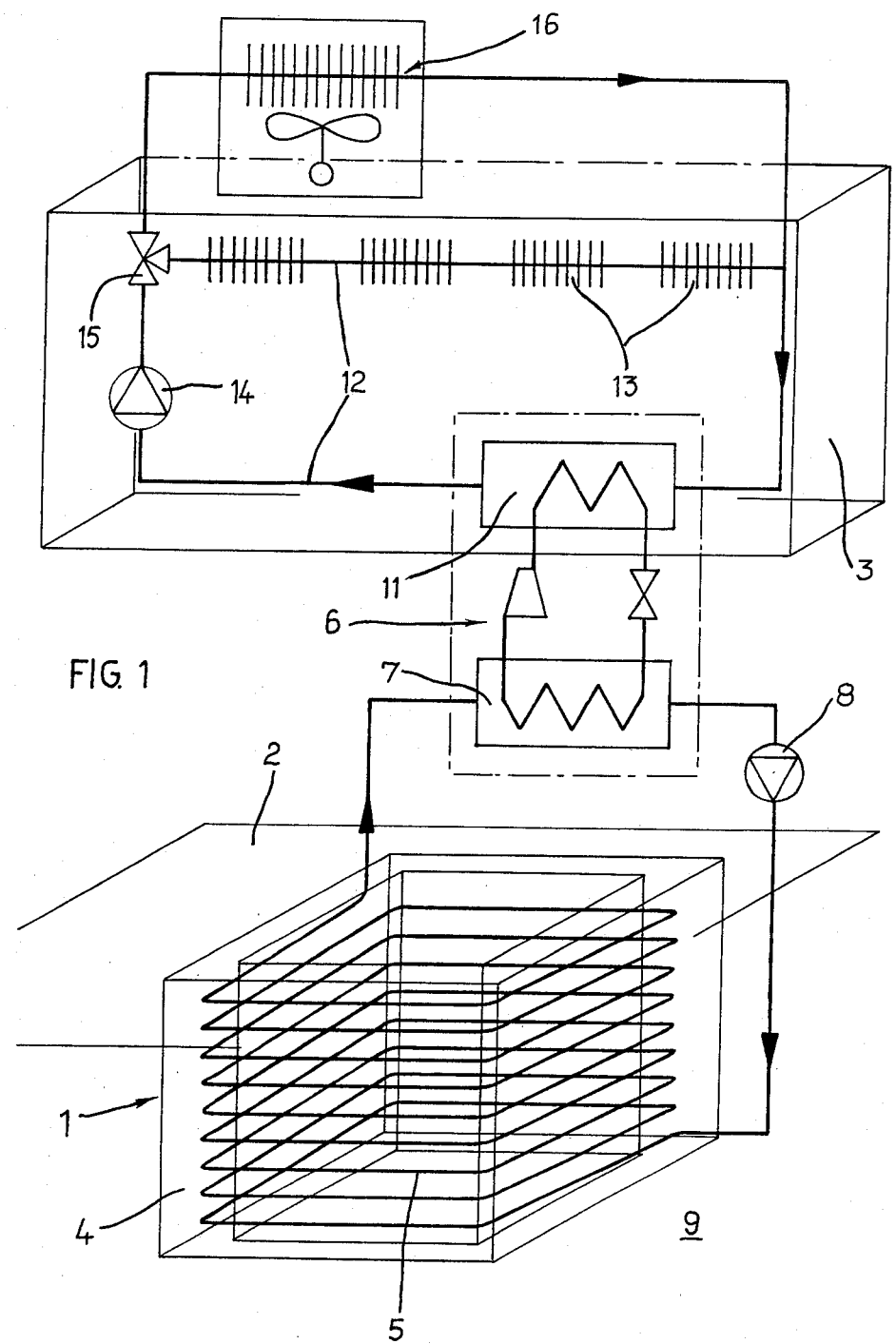

United States Patent [19]

Girard

[11] 4,237,963
[45] Dec. 9, 1980

[54] PROCESS AND APPARATUS FOR CONTROL OF THE CLIMATIC ENVIRONMENT OF AN UNDERGROUND ENCLOSURE INCLUDING A SOURCE OF EXTRANEOUS HEAT

[75] Inventor: Edmond Girard, Boulogne-Billancourt, France

[73] Assignee: Messier, Paris, France

[21] Appl. No.: 885,865

[22] Filed: Mar. 13, 1978

[30] Foreign Application Priority Data

Apr. 6, 1977 [FR] France .................. 77 10468

[51] Int. Cl.³ .................. F28D 15/00; F28F 13/00
[52] U.S. Cl. .......................... 165/1; 62/260; 126/400; 165/45; 165/98; 165/101; 165/107 R; 165/DIG. 4
[58] Field of Search ............... 165/45, 1, 2, 104 S, 165/DIG. 4, 35, 36, 107, 98, 99, 101, 103, 96; 62/260; 126/400

[56] References Cited

U.S. PATENT DOCUMENTS

| | | | |
|---|---|---|---|
| 2,167,878 | 8/1939 | Crawford | 165/45 |
| 2,595,905 | 5/1952 | Telkes | 165/45 |
| 2,722,107 | 11/1955 | Gay | 62/260 |
| 2,954,680 | 10/1960 | Ruff | 165/45 |
| 3,295,591 | 1/1967 | Thomason | 126/400 |
| 3,563,305 | 2/1971 | Hay | 165/104 S |
| 4,091,636 | 5/1978 | Margen | 165/45 |

*Primary Examiner*—Sheldon Richter
*Attorney, Agent, or Firm*—J. Harold Nissen

[57] ABSTRACT

Process and apparatus for control of the climatic environment of an underground enclosure having at least one source tending to emit a quantity of extraneous heat and associated with premises presenting a potential need for heating. Utilization is made directly of the regulating characteristics of the ground at a depth taking account of thermal inertia in order to enable the ground to operate as a heat source or thermal absorbent. For this purpose, apparatus is provided which is arranged entirely under the level of the ground at a mean depth which should not exceed 10 m, at latitudes in France, but this depth is variable according to the particular geological nature of the terrain. To take advantage of the thermal buffer the temperature of which is generally about 12° C. in the Parisian region, the apparatus includes a wall structure with some of the walls formed of a material with a high coefficient of thermal exchange. The apparatus also includes an array of piping embedded in the walls together with means for circulating a refrigerant through the piping at low temperature, and a utilization circuit including an array of heat diffusers arranged in the premises to be heated, and a heat pump including an evaporator located in circuit of the piping and a condenser located in the utilization circuit. Shutters are also provided in the walls, and depending on their open or closed condition determines the transfer of heat through the lateral walls.

14 Claims, 2 Drawing Figures

PROCESS AND APPARATUS FOR CONTROL OF THE CLIMATIC ENVIRONMENT OF AN UNDERGROUND ENCLOSURE INCLUDING A SOURCE OF EXTRANEOUS HEAT

This invention relates to a process and apparatus for control of the climatic environment of an underground enclosure, including at least one source tending to emit a quantity of extraneous heat, and possibly associated with premises presenting a potential need for heating.

By "a source tending to emit a quantity of extraneous heat" is to be understood any apparatus, machinery or groups of machines of which the use or the operation is inevitably accompanied by a dissipation of unwanted thermal energy, both from the point of view of the environment and from the point of view of the apparatus or the machine, heating of which could prejudice its performance, which may render it essential to arrange such sources of extraneous heat within enclosures or rooms which are air conditioned, or of which the climatic environment is controlled.

As traditional examples may be quoted, computer rooms and telephone exchanges, where, respectively, the computers and the telephone bays when functioning usually dissipate a quantity of extraneous heat which is so substantial that it is necessary to blow into the premises containing these installations, cold air from refrigeration units, the blowing being effected, for example, through a false floor, and the air reheated by contact with the sources of extraneous heat being evacuated to atmosphere through a false ceiling; while in winter for example, a heating installation can be brought into operation to maintain these premises at an acceptable temperature without involving any alteration in the operation of the installations. This does not take account of the personnel involved in the operation of these installations, and who reside in the neighbouring premises or annexes, such as offices, presenting a potential need of heating which is not unimportant since this need exists, in our latitudes, for about half of the year.

In order to promote the evacuation of the extraneous heat to atmosphere, the installations previously exemplified are disposed in premises at surface level, including, in addition, the necessary refrigeration and heating installations, and adjacent to the offices heated by a possible second heating installation.

It is known, on the other hand, that the variations in the temperature of the external air, which are of two types, diurnal variation and annual variation, of which the amplitude is variable in accordance with the climate, are repeated in the strata of the ground, with an attenuation which increases as the depth of the strata is increased. Moreover, the minima and maxima of temperature at a given depth undergo, in relation to those of the external temperature, delays of which the importance likewise increases with the depth. In the Parisian region, it has been verified that the diurnal variation is practically negligible from a depth of 0.80 m., and the annual variation from a depth of 10 m.

The idea at the basis of the invention consists in utilising directly the regulating characteristics of the ground at depth, taking account of the thermal inertia which is possessed thereby, in order to cause it to operate as a heat source or, inversely, as a thermal absorbent, according to the needs of the moment, in relation to an enclosure including the sources of extraneous heat.

To this end, the enclosure under consideration should be arranged entirely under the level of the ground, at a mean depth which should not in general exceed 10 m, in our latitudes, this depth being however variable according to the particular geological nature of the terrain in which the enclosure under consideration will be embedded, in order to take advantage of the effect of the thermal buffer furnished by the surrounding terrain, of which the temperature over the year, at this depth, is substantially constant, and is, for example, about 12° C. in the Parisian region.

The present invention provides a process for the control of the climatic environment of a subterranean enclosure including at least one source capable of emitting a quantity of extraneous heat, which comprises promoting the transfer of heat through the walls of the enclosure from the ground to the enclosure due to the natural phenomenon of thermal counterbalancing, in order to draw upon the thermal energy stored in the ground to maintain the said enclosure at the temperature of the ground, and, in the event of the emission of extraneous heat from the said source or sources, either promoting the transfer of heat through the walls of the enclosure from the latter to the ground due to the said counterbalancing phenomenon, in order to draw upon the capacity of the ground for storage of thermal energy and to maintain the enclosure at a temperature equal to or slightly above that of the ground, inhibiting the said thermal transfer from the enclosure to the ground to satisfy an occasional need for heating, or controlling the said thermal transfer in such a manner that part of the thermal energy emitted from said source or sources is stored in the ground and part is retained to satisfy a lesser need for heating.

An apparatus according to the invention, for carrying out this process, comprises a subterranean enclosure including or intended to include at least one source of extraneous heat, the said enclosure comprising a wall structure of which at least the lateral walls are formed of a material with a high coefficient of thermal exchange, the internal surfaces of said lateral walls being covered by an array of movable shutters formed of a thermally insulating material, and the arrangement being such that opening of the shutters promotes transfer of heat through said lateral walls whilst closure of the shutters inhibits it.

In the case where this underground enclosure is associated with premises frequented by personnel involved in the functioning of the installations located in this enclosure and constituting the sources of extraneous heat, it is advantageous, in order to satisfy the potential need of heating of these premises, to transfer to them a part of the heat tending to become transferred from the ground to the enclosure, and thus to draw upon part of the thermal energy stored in the ground to heat the premises. In addition, upon the emission into the enclosure of a quantity of extraneous heat, the process according to the invention consists in transferring into the premises this quantity of extraneous heat, if necessary reduced by a second quantity of heat transferred through the walls of the enclosure towards the ground, if the quantity of extraneous heat emitted is greater than that required to heat the premises, whereby the capacity of the ground for storing thermal energy is used to absorb the excess of the extraneous heat.

According to one embodiment of the invention, the apparatus further comprises an array of piping embedded in the walls of the enclosure, means for circulating a refrigerant through said piping at low temperature, a utilisation circuit including an array of heat diffusers arranged in premises to be heated, and a heat pump including an evaporator located in the circuit of said piping and a condenser located in said utilisation circuit.

Figure 2:
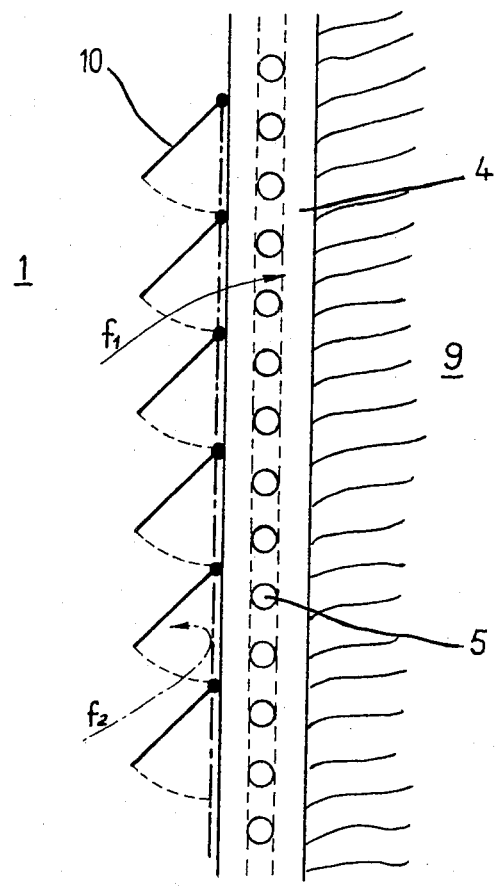

One embodiment of the invention is illustrated by way of example in the accompanying drawings, in which:

FIG. 1 shows diagrammatically an apparatus according to the invention, permitting the control of the climatic environment of the room containing the telephone bays of a telephone exchange, of which the offices present a need of heating, and FIG. 2 shows a section of a lateral wall of the said room.

Referring to the drawings, the telephone exchange comprises a room 1, situated entirely under the surface 2 of the ground, at a depth in the region of 10 m, and of premises 3, situated on the surface and requiring to be heated. The walls 4 of the underground room 1 are formed of a material having a high coefficient of thermal exchange, and an array 5 of piping, embedded in the walls 4, and disposed as illustrated in FIG. 1. The piping may possibly constitute wholly or in part the structural frame of this room. In FIG. 1, the array 5 extends only in the walls bounding the lateral surface of the room 1, for the purpose of clarity in the diagrammatic illustration, but it is to be understood that in or under the floor, constituting the foundation slab of the room 1, there can be arranged an array complementary to the array 5, possibly coupled to the latter by one or more valves, in a manner such as to supplement the heat exchange surface. The array 5 of piping is permeated by a refrigerant liquid at low temperature, issuing from the evaporator 7 of a heat pump 6, and returning to the latter, under the action of the circulating pump 8, after being reheated by having absorbed the heat transferred into the walls 4, and issuing immaterially from the ground 9, surrounding the room 1, or from the interior of the room 1, when the sources of extraneous heat which are disposed therein, for example telephone bays (not shown), are active and dissipate a certain thermal energy. On the lateral internal surface of the room 1, is disposed an array of pivoted shutters 10, the opening of which is controllable, formed of an insulating material. In their position of maximum opening, shown in full lines in FIG. 2, the pivoted shutters 10 promote the transfer of heat through the walls 4 in one direction or the other, while in the shut position, shown in dot and dashed lines, the shutters 10 inhibit the thermal exchange between the room 1 and the ground 9. The heat absorbed by the refrigerant liquid circulating in the array 5 is given up in the evaporator 7 to the cold generating fluid circulating in the heat pump 6, which in turn gives it up in the condenser 11 of the heat pump 6, to the fluid of the utilisation circuit 12 comprising an array of radiators 13 or other heat diffusers installed in the premises to be heated 3, and mounted in series as shown in the illustration or alternatively in parallel, the circulation of the fluid in the circuit 12 being assured by a circulating pump 14. A three-way valve 15 allows the diversion of the fluid of the utilisation circuit 12 leaving the condenser 11, towards a circuit 16, connected in parallel with the array of diffusers 13, and provided with an externally arranged extraction apparatus, for example of the aero-refrigerant type, such as a condenser to air. It should be noted again that the ceiling of the room 1, which may possibly serve for separation between this room 1 and the premises 3 located on a higher level, should exhibit as good a thermal insulation as possible. In that way, in the absence of any need for heating of the premises 3, and assuming that the sources of heat within the room 1 are inactive or slightly active, it will suffice to maintain the heat pump at rest and to set the maximum opening of the shutters 10, in order to achieve a heat transfer from the ground 9 towards the room 1, which will be maintained at an acceptable temperature for a good preservation of the sources which are inactive or ticking over, this temperature tending to be that of the surrounding ground 9, which may not be inconvenient for a room not intended to be constantly occupied by personnel.

In the case where the sources are more active, and emit a quantity of extraneous heat sufficiently significant that it cannot be retained in their immediate environment (that is to say the room 1), without disturbing the functioning of the said sources, the setting of the shutters 10 in an open position will assure a heat transfer from the room 1 towards the surrounding ground 9 according to the arrow f1 of FIG. 2. The capacity of the ground 9 for absorbing heat will then be utilised to conserve the room 1 at a temperature for favourable functioning of the sources. If the generation of heat by the sources is too great to become sufficiently absorbed by the surrounding ground 9, the setting in operation of the heat pump 6 and the circulation pumps 8 and 14 will ensure, via the refrigerant liquid of the circuit 5, the evacuation of the excess heat not absorbed by the ground 9 towards the utilisation circuit 12, and, nevertheless, in the absence of a need for heating of the premises 3, control of the valve 15 will permit the excess heat to be dissipated into the atmosphere via the aero-refrigerant device 16.

In the case where a need for heating of the premises 3 exists, while the sources within the room 1 are inactive, the heat pump may be placed in operation, together with the circulation pumps 8 and 14, and the shutters 10 may be placed in an intermediate position so that transfer of heat takes place from the ground simultaneously towards the room 1 and towards the refrigerant fluid of the circuit 5, that is to say, via the intermediary of the heat pump 6, the circuit 12 and the valve 15 supplying the diffusers 13, towards the premises 3. If the sources within the room 1 are slightly active, their production of heat being nevertheless sufficient to ensure the maintenance of the room 1 at a minimal acceptable temperature (see the arrow f2 of FIG. 2), the shutters 10 may be shut, in order that the essential thermal transfer can take place from the ground 9 towards the circuit 5, and then towards the premises 3. On the contrary, in the case of a substantial production of heat on the part of the sources, the transfer of heat will take place simultaneously from the room 1 towards the ground 9 and towards the circuit 5, then towards the premises 3, the shutters 10 being open, and any variation of the opening being allowable to equalise the thermal exchange between the room 1 and the premises 3.

The process and apparatus according to the invention thus makes it possible to obtain, with a great versatility of operation and in an economical manner, a good control of the climatic environment of any underground enclosure capable of being put to use, for example as an artificial conservation cellar, a stock chamber, a cinema auditorium or a computer room, the sources of extraneous heat likewise being of variable kind.

It should be understood that without departing from the scope of the invention, it is possible to associate with the described apparatus any means permitting, for example, the introduction into the underground room of fresh air in a quantity determined as a function, for example, of the temperature of the underground room and/or the external air, as well as any means for ventilation or standby heating of the premises.

What we claim is:

1. A process for the control of the climatic environment of a subterranean enclosure including at least one source capable of emitting a quantity of extraneous heat, which comprises promoting the transfer of heat through selected parts of the walls of the enclosure from the ground to the enclosure due to the natural phenomenon of thermal counterbalancing in order to draw upon the thermal energy stored in the ground to maintain the enclosure at the temperature of the ground, and in the event of the emission of extraneous heat from the source or sources, either controlling and promoting the transfer of heat through the walls of the enclosure from the latter to the ground due to the counterbalancing phenomenon in order to draw upon the capacity of the ground for storage of thermal energy and to maintain the enclosure at a temperature equal to or slightly above that of the ground, inhibiting said thermal transfer from the enclosure to the ground to satisfy an occasional need for heating or controlling said thermal transfer in such a manner that part of the thermal energy emitted from said source or sources is stored in the ground and part is retained to satisfy a lesser need for heating, and transferring the residual extraneous heat from the enclosure through the selected parts to the atmosphere where the extraneous heat emitted by the sources is greater than the total of both that which is capable of being absorbed by the ground and that which is required to satisfy the need for heating.

2. A process as claimed in claim 1, wherein the said subterranean enclosure is associated with premises presenting the said occasional need for heating, and the said process further comprises, in addition to transferring to said premises a part or the whole of said thermal energy emitted by said sources, in order to satisfy said need, the step of controlling and transferring to said premises a part or all of the heat transferred from the ground towards said enclosure, in order to satisfy the said need when the said sources are idle or do not emit sufficient thermal energy to satisfy said need.

3. An apparatus for the control of the climatic environment of a subterranean enclosure having at least one source tending to emit a quantity of heat, including in combination:

a subterranean enclosure comprising at least one source capable of including or intended to include a quantity of extraneous heat;

said enclosure comprising a wall structure of which at least the lateral walls are formed of a material with a high coefficient of thermal exchange, said wall material being effective to promote the transfer of heat through the walls of said enclosure from the ground to the enclosure due to the natural phenomenon of thermal counterbalancing, in order to draw upon the thermal energy stored in the ground to maintain said enclosure at the temperature of the ground, said lateral walls having openings in their internal surfaces;

an array of movable shutters adapted to cover said openings in the internal surfaces of said lateral walls, said array of movable shutters being formed of a thermally insulating material, the arrangement being such that movement of said shutters for opening thereof promotes transfer of heat through said openings in said lateral walls while movement of said shutters for closure of the shutters inhibits it; and, means to control said shutters, in the event of the emission of extraneous heat from the said source or sources, either to promote the transfer of heat through said openings in the walls of the enclosure from the latter to the ground due to the counterbalancing phenomen, in order to draw upon the capacity of the ground for storage of thermal energy and to maintain the enclosure at a temperature equal to or slightly above that of the ground, or to inhibit the thermal transfer form the enclosure to the ground to satisfy an occasional need for heating, or to control the thermal transfer in such a manner that part of the thermal energy emitted from said source or sources is stored in the ground and part is retained to satisfy a lesser need for heating.

4. Apparatus as claimed in claim 3 in combination with a premise presenting an occasional need for heating comprising:

premises presenting said occasional need for heating associated with said subterranean enclosure; and, said enclosure in addition to transferring to said premises a part or the whole of the thermal energy emitted by said sources, in order to satisfy said need, also transfers to said premises a part of the heat transferred from the ground towards said enclosure, in order to satisfy the need when said sources are idle or do not emit sufficient thermal energy to satisfy the need.

5. Apparatus as claimed in claim 3 or 4 wherein said source comprises:

an array of piping embedded in the walls of the enclosure; and, means to circulate a refrigerant through said piping at a low temperature.

6. Apparatus as claimed in claim 4, wherein said source comprises:

an array of piping embedded in the walls of said enclosure, and means to circulate a refrigerant through said piping at a low temperature; and, said premises comprising:

a utilization circuit including an array of diffusers arranged in said premises to be heated, associated with said array of piping for the transfer of heat between said array of piping and said array of diffusers.

7. Apparatus as claimed in claim 6, comprising:

a heat pump including an evaporator located in the circuit of said piping; and, a condenser located in said utilization circuit.

8. Apparatus according to claim 6 or 7, including a circuit incorporating an extractor for dissipating heat to atmosphere connected in parallel with the heat diffusers of said utilization circuit.

9. Apparatus as claimed in claim 8, further comprising a supplementary array of pipes arranged under the floor of said enclosure and connected to the first array by valve means in such a manner to augment the capacity for heat exchange with the ground.

10. Apparatus as claimed in claim 4, wherein said source comprises:
   an array of piping embedded in the walls of said enclosure;
   means to circulate a refrigerant through said piping at a low temperature; and,
   said shutters being on the inside of said enclosure and when opened aid in the transfer of residual extraneous heat from said enclosure to said atmosphere when the extraneous heat emitted by said sources is greater than the total of both that which is capable of being absorbed by the ground and that which is required to satisfy the need for heating.

11. Apparatus as claimed in claim 10, including a utilization circuit associated with said source and premises to be heated, said utilization circuit comprising an array of diffusers arranged in said premises to be heated.

12. Apparatus as claimed in claim 11, including a circuit incorporating an extractor for dissipating heat to the atmosphere connected in parallel with the heat diffusers of said utilization circuit.

13. Apparatus as claimed in claim 12, comprising a supplementary array of pipes arranged under the floor of said enclosure and valve means connecting said first-mentioned array to said supplementary array of pipes in such a manner to augment the capacity for heat exchange with the ground.

14. Apparatus as claimed in claim 3, wherein said shutters are pivotally connected to the lateral walls on the inside of said enclosure.

* * * * *